Sept. 28, 1965 R. E. BONNER 3,209,328

ADAPTIVE RECOGNITION SYSTEM FOR RECOGNIZING SIMILAR PATTERNS

Filed Feb. 28, 1963 3 Sheets-Sheet 1

INVENTOR.
RAYMOND E. BONNER

BY John J. Goodwin

ATTORNEY

United States Patent Office 3,209,328

Patented Sept. 28, 1965

3,209,328

ADAPTIVE RECOGNITION SYSTEM FOR RECOGNIZING SIMILAR PATTERNS

Raymond E. Bonner, Yorktown Heights, N.Y., assignor to International Business Machines Corporation, New York, N.Y., a corporation of New York

Filed Feb. 28, 1963, Ser. No. 261,750
11 Claims. (Cl. 340—146.3)

The present invention relates to recognition systems and more particularly to a recognition system which is self-adapting for recognizing given input information.

Recognition systems, in general, are systems which function in cooperation with unknown or "specimen" indicia and provide output information related to the content of the specimen indicia. One example of a recognition system is a phonetic typewriter which responds to spoken sound and provides a printed output of the spoken words. Other examples include character recognition devices which scan printed material and provide output indications of the content of the printed material, for example, translating machines which scan printed matter in a foreign language and print the English translation.

Included within the general definition of "recognition systems" is a class of devices referred to as adaptive. Such devices usually operate in two modes termed the "learning" mode and the "testing" mode. In the learning mode, a specimen is introduced to the device and the device is informed of the identity of the specimen. The device is conditioned such that in the testing mode, upon the next occurrence of the specimen the proper identification of the specimen is provided as an output.

The present invention relates to an adaptive recognition system which is self-informing. When an unknown specimen is introduced to the system, the system forms a "positive" definition of the specimen and will then respond only to inputs which are "similar" to the learned specimen. The degree of similarity to which the system will respond can be adjusted within desired limits by the setting of particular threshold levels. The present invention is also capable of responding to a sequential group of sub-patterns and forming a "positive" definition of the total pattern.

An object of the present invention is to provide an adaptive recognition system responsive to sequential sub-patterns.

Another object of the present invention is to provide a recognition system which adaptively learns a given sequence of sub-patterns and subsequently responds only to further inputs which are highly similar to the original learned sequence of sub-patterns.

A further object of the present invention is to provide an adaptive recognition system which provides an output signal in response to sequential sub-patterns wherein said output signal is representative of the degree of similarity between said sequential sub-patterns and a previously learned sequence of sub-patterns.

A still further object of the present invention is to provide an adaptive recognition system which establishes a stored indication of the occurrence of each element of each sub-pattern of a total sequential input pattern with the occurrence of the other elements of the sequential input pattern.

The foregoing and other objects, features and advantages of the invention will be apparent from the following more particular description of a preferred embodiment of the invention, as illustrated in the accompanying drawings.

In the drawings:

FIG. 1 is an illustrative diagram of the relationship between FIGS. 1A and 1B.

FIGS. 1A and 1B provide a schematic block diagram of an adaptive recognition system following the principles of the present invention.

Figures 1, 1A:
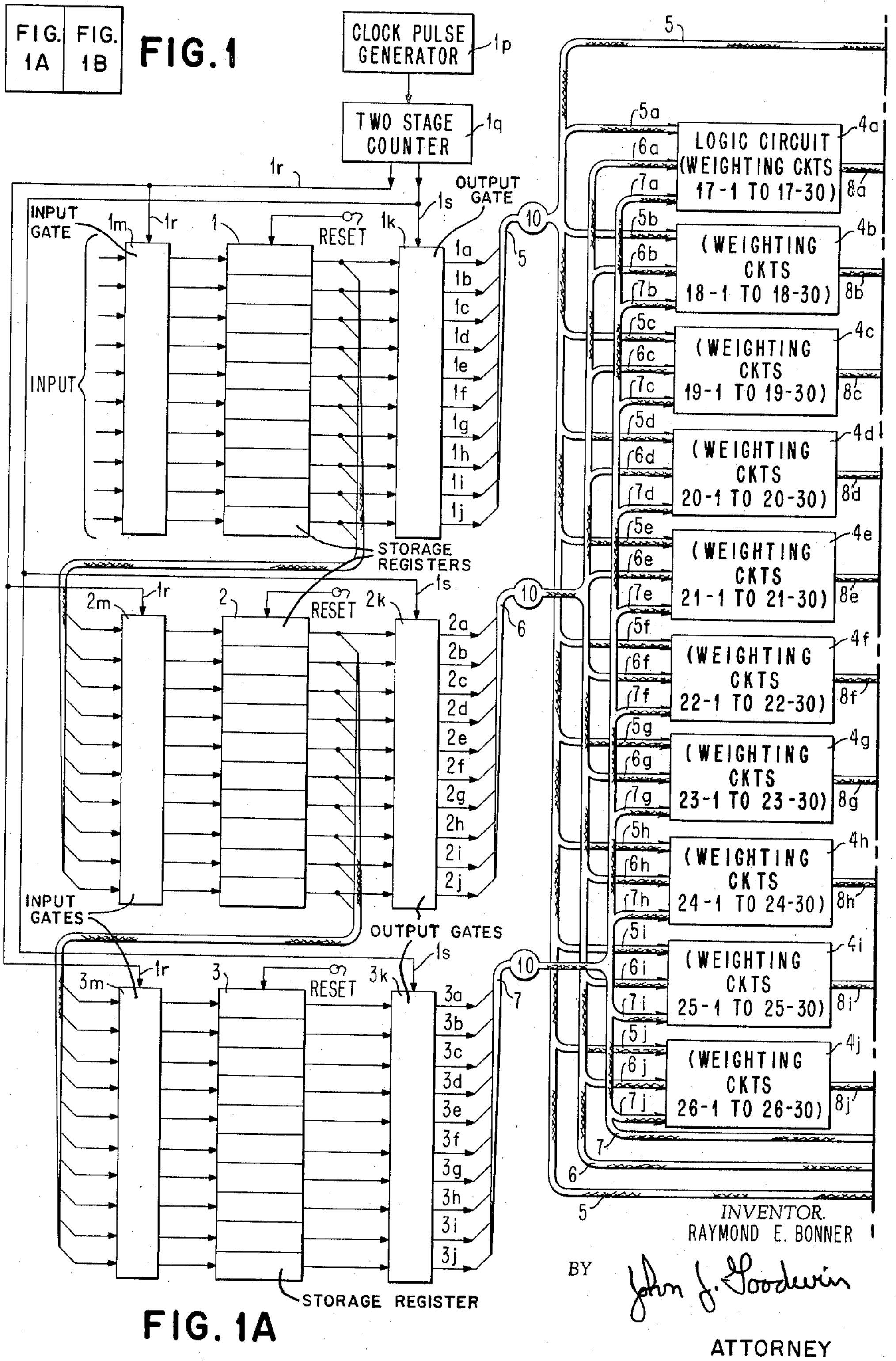

In the present embodiment, the system to be described is responsive to a pattern of input information bits. The input information may be a sequential pattern consisting of a sequence of sub-patterns represented as a set of $n$ binary variables. A sequential pattern is herein defined as a total pattern composed of a number of binary sub-patterns having sequential order. Any event which happens over a period of time can generate a sequential pattern by the time sampling of a set of continuous measurements of properties happening during the event. For example, an event might be a heartbeat. A set of properties associated with the event might be electrical potential measured at various points on the body. The quantized amplitudes of this set of measurements at a given instant would be a sub-pattern of the sequential pattern composed of the results at various instants of time. It is to be understood that the pattern of binary input information may also be representative of physical phenomena such as spoken words and printed characters, or may be binary variables arranged in a programmed code. The invention may be employed in a variety of applications, and the example to be described has been selected for ease of explanation and is not to be considered as restricting the various practical uses of the invention.

Consider an input pattern consisting of a sequence of sub-patterns of $n$ binary variables where $n$ is selected as ten for this example. Each variable may represent an alphabetical character, each sub-pattern may represent a word, and each input pattern may represent a sentence. Thus, the sentence "DAD HAD CHAFE" (chosen for simplicity from the group of the first ten alphabet characters) would appear as follows.

*Table I*

| | A | B | C | D | E | F | G | H | I | J |
|---|---|---|---|---|---|---|---|---|---|---|
| Sub-pattern No. 1 | 1 | 0 | 0 | 1 | 0 | 0 | 0 | 0 | 0 | 0 |
| Sub-pattern No. 2 | 1 | 0 | 0 | 1 | 0 | 0 | 0 | 1 | 0 | 0 |
| Sub-pattern No. 3 | 1 | 0 | 1 | 0 | 1 | 1 | 0 | 1 | 0 | 0 |

A 1-bit in each sub-pattern indicates that the associated alphabet character appears at least once in the word. The alphabet characters are one example of the meaning which may be applied to the sub-patterns. In the digital code, the three sub-patterns in Table I would represent the numbers 9, 137, and 181. The sub-patterns might also represent the digital form of a given speech signal.

In the system to be described the sub-patterns are sequentially introduced as inputs during what is hereinafter referred to as the "learning" mode. During the learning mode the system establishes a stored indication of each time a 1-bit of each given sub-pattern was present with other 1-bits of the given sub-pattern and with 1-bits of the other sub-patterns of the sequence at given times. As will be seen in the embodiment to be described, the stored indications are established as settings of elctronic latch circuits. It should be understood throughout the following discussion that the stored indications may be effected in various equivalent ways. For example, in a mechanical system by means of latching relays, and in an optical system by means of exposed portions on a photosensitive medium. For purposes of illustration, the present invention is herein embodied and described as an electronic system.

Figures 1B, 3:
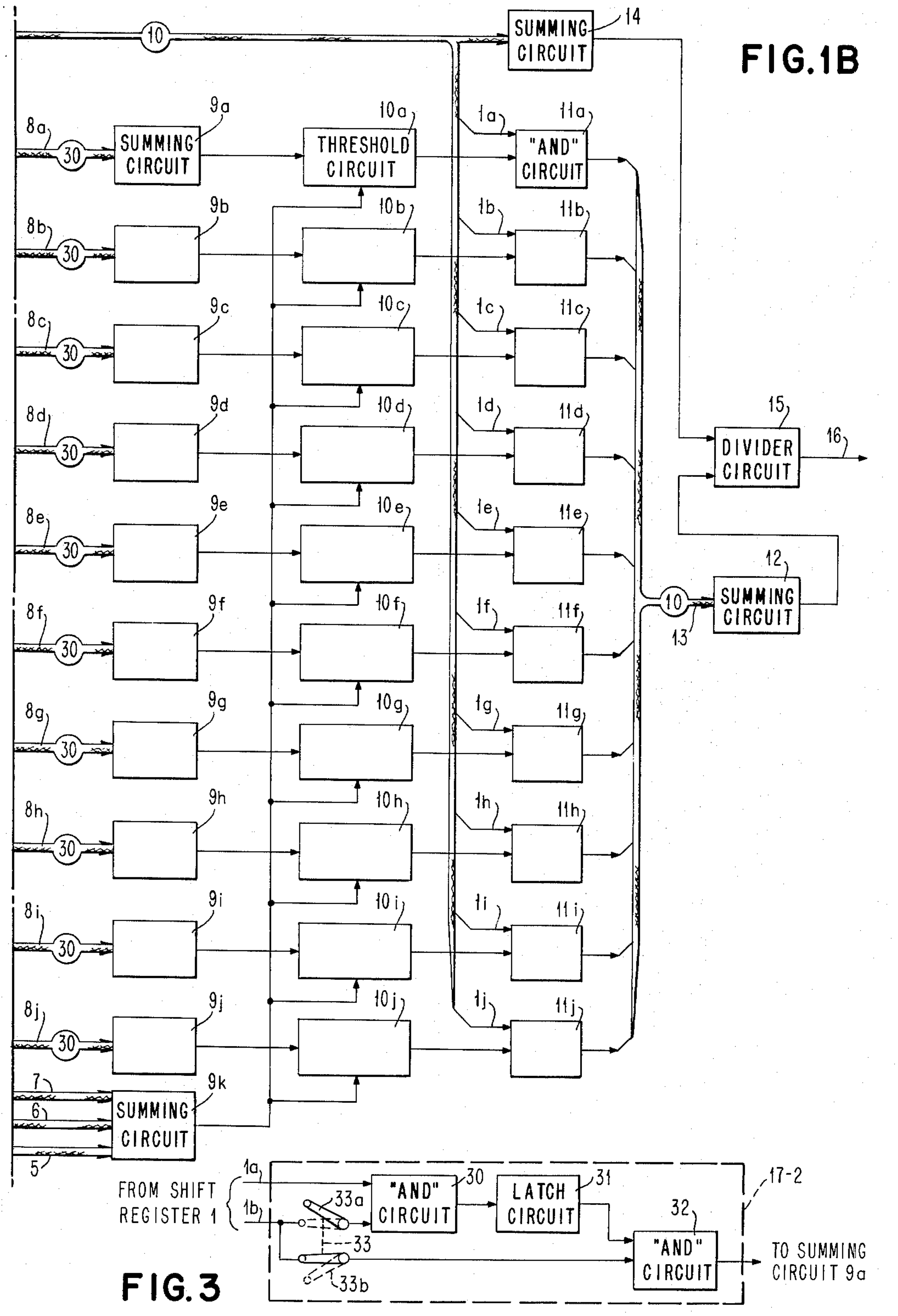
FIG. 3 is a schematic block diagram of a detail of the circuit of FIG. 2.

Referring to FIGS. 1A and 1B, a block diagram of an embodiment of the present invention operative with the above-described input code of Table I is illustrated. Blocks 1, 2, and 3 represent conventional storage registers. Since, in the present example, $n$ is ten, each storage register has ten bit positions, and since the input pattern contains three sub-patterns, three storage registers are employed. Storage register 1 employs an input gate 1*m* and an output gate 1*k*. Likewise, input gate 2*m* and output gate 2*k* are associated with storage register 2 and input gate 3*m* and output gate 3*k* are associated with storage register 3. A clock pulse generator 1*p* is provided to produce a series of pulses at given time intervals, for example at half second intervals. Clock pulse generator 1*p* is connected to a two stage counter 1*q* which provides gating pulses alternately on leads 1*r* and 1*s* at one second intervals. Lead 1*r* is connected to input gates 1*m*, 2*m*, and 3*m* and lead 1*s* is connected to output gates 1*k*, 2*k*, and 3*k*. The operation of the storage registers 1, 2, and 3 is conventional. Initially ($t_0$) each of the ten bit positions of each storage register 1, 2, and 3 are set to the 0-bit state. At $t_1$ a signal on lead 1*r* gates a ten bit input signal (the first sub-pattern) through gate 1*m* into the ten bit positions of storage register 1 and at the same time, via gate 2*m*, introduces the ten 0-bits of register 1 into register 2 and the ten 0-bits of register 2 into register 3 via gate 3*m*. At time $t_2$ the pulse on lead 1*s* gates the contents of registers 1, 2, and 3 to output leads 1*a* through 1*j*, 2*a* through 2*j* and 3*a* through 3*j* via gates 1*k*, 2*k*, and 3*k*. At time $t_3$ a pulse on lead 1*r* gates the next ten bit input signal (the second sub-pattern) into register 1 while gating the contents of register 1 into register 2 and the contents of register 2 into register 3. At time $t_4$ a pulse on lead 1*s* again gates the contents of registers 1, 2, and 3 to output leads 1*a* through 1*j*, 2*a* through 2*j*, and 3*a* through 3*j*. Thus, one pulse from counter 1*q* gates an input signal into register 1 and advances the stored patterns one register while the succeeding pulse from counter 1*q* gates the contents of the three registers to the thirty output leads 1*a* through 3*j*, each output lead respectively being associated with a separate bit storage position of registers 1, 2, and 3. It is to be noted that if serial rather than parallel bit transfer is desired, an equivalent arrangement of shift registers could be employed rather than storage registers, however this would require a series of ten shift pulses for each transfer.

A plurality of logic circuits 4*a* through 4*j* are provided. In the general case $n$ logic circuits are required, therefore ten logic circuits 4*a* through 4*j* are included in the present example. Each one of the logic circuits 4*a* through 4*j* is connected (via the output gates 1*k*, 2*k*, and 3*k*) to all the bit positions of each of the storage registers 1, 2, and 3. Thus, the outputs of the ten bit positions of storage register 1 are connected to logic circuits 4*a* through 4*j* from output gate 1*k* via output leads 1*a* through 1*j* (combined into ten lead cable 5 and the ten lead branch cables 5*a* through 5*j*). Likewise, logic circuits 4*a* through 4*j* are connected to the bit positions of register 2 via ten lead cable 6 and ten lead branch cables 6*a* through 6*j* and to the bit positions of register 3 via ten lead cable 7 and ten lead branch cables 7*a* through 7*j*. There are therefore, a total of thirty ($n$ times the number of storage registers) input leads to each of the logic circuits 4*a* through 4*j*. The thirty input leads to each logic circuit 4*a* through 4*j* are connected to separate weighting circuits within the logic circuits to be later described. There are thirty weighting circuits in each logic circuit, each having a separate output. The thirty output leads from each logic circuit 4*a* through 4*j*, represented by cables 8*a* through 8*j*, are coupled respectively to summing circuits 9*a* through 9*j*.

The outputs of summing circuits 9*a* through 9*j* are coupled respectively to threshold circuits 10*a* through 10*j*. The ten output leads 1*a* through 1*j*, 2*a* through 2*j*, and 3*a* through 3*j* of each of the storage register output gates 1*k*, 2*k*, and 3*k* are coupled, via cables 5, 6, and 7, to a summing circuit 9*k*. The output of summing circuit 9*k* is connected to each of the threshold circuits 10*a* through 10*j* to set the threshold level thereof.

The outputs of threshold circuits 10*a* through 10*j* are respectively connected to "AND" gates 11*a* through 11*j*. The other inputs to "AND" gates 11*a* through 11*j* are the output leads 1*a* through 1*j* respectively from output gate 1*k* of register 1. The outputs of each of the "AND" gates 11*a* through 11*j* are coupled to summing circuit 12 via ten lead cable 13. The ten output leads 1*a* through 1*j* from output gate 1*k* of register 1 are also connected, via cable 5, to a summing circuit 14. The sum of the outputs of "AND" gates 11*a* through 11*j* from summing circuit 12 and the sum of the outputs of register 1 from summing circuit 14 are applied to divider circuit 15 which provides an output on lead 16 which is the ratio of the two summations.

Figure 2:
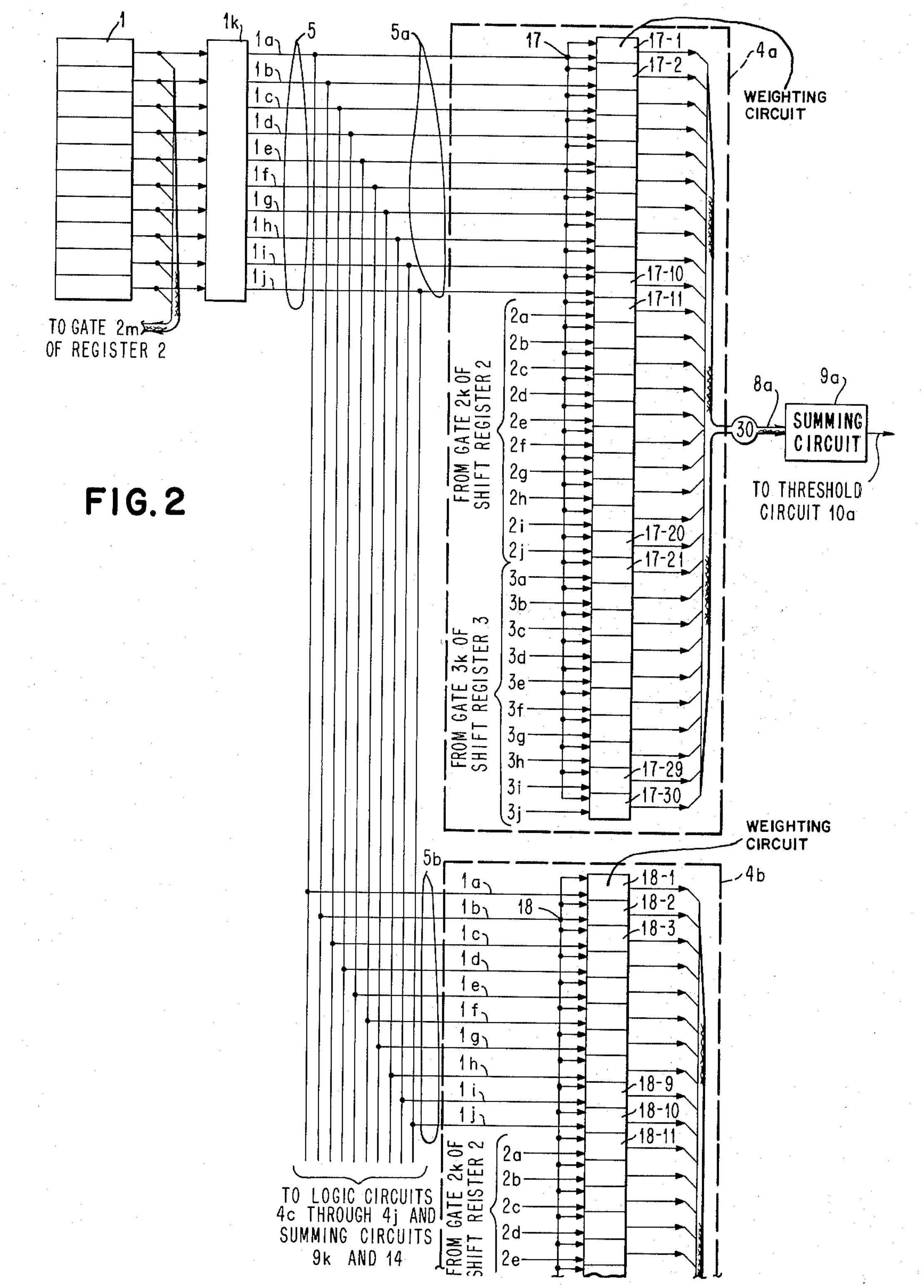
FIG. 2 is a schematic block diagram of a detail of the system shown in FIGS. 1A and 1B.

Referring to FIG. 2, a detailed illustration of a portion of the system of FIG. 1A is provided showing the elements included in logic circuit 4*a* and the manner in which registers 1, 2, and 3 are connected thereto (via output gates 1*k*, 2*k*, and 3*k*). Logic circuit 4*a* contains a plurality (thirty in the present example) of weighting circuits 17–1 through 17–30. Each logic circuit 4*a* through 4*j* (FIG. 1) contains weighting circuits individually connected via gates 1*k*, 2*k*, and 3*k* to each bit position of each register 1, 2, and 3. Therefore, each logic circuit 4*a* through 4*j* of FIG. 1A contains thirty weighting circuits as shown in logic circuit 4*a* of FIG. 2. The weighting circuits in each of the logic circuits 4*b* through 4*j* are not shown in FIG. 2, but they are arranged similar to weighting circuits 17–1 through 17–30 of logic circuit 4*a* and will be considered to have reference numbers 18–1 through 18–30 for logic circuit 4*b*, 19–1 through 19–30 for logic circuit 4*c*, etc. up to numbers 26–1 through 26–30 for the weighting circuits of logic circuit 4*j*. The first ten weighting circuits 17–1 through 17–10 are respectively connected to the ten bit positions of register 1 via leads 1*a* through 1*j* and output gate 1*k*. The next ten weighting circuits 17–11 through 17–20 are respectively connected to the ten bit positions of register 2 via leads 2*a* through 2*j* and output gate 2*k* and the last ten weighting circuits 17–21 through 17–30 are respectively connected to the ten bit positions of register 3 via leads 3*a* through 3*j* and output gate 3*k*.

The registers 1, 2, and 3 are connected via leads 1*a* through 3*j* to each of the thirty weighting circuits in the remaining logic circuits 4*b* through 4*j* in a manner identical to that illustrated for logic circuit 4*a* in FIG. 2.

In addition to the separate inputs on leads 1*a* through 3*j*, each of the weighting circuits 17–1 through 17–30 have a second input consisting of the output of the first bit position of register 1 on lead 1*a* obtained at junction 17. The function of the weighting circuits 17–1 through 17–30 is to compare the output of each of the bit positions of registers 1, 2, and 3 with the first bit position of register 1. Each of the weighting circuits 18–1 through 18–30 of logic circuit 4*b* have, in addition to the inputs on leads 1*a* through 3*j*, a second input consisting of the output from the *second* bit position of register 1 on lead 1*b* obtained at junction 18. Thus the outputs of each of the bit positions of registers 1, 2, and 3 are compared with the output of the second bit position of register 1. In like manner the outputs of each bit position of registers 1, 2, and 3 on leads 1*a* through 3*j* are compared with the output of the *third* bit position from register 1 on lead 1*c* in weighting circuits 19–1 through 19–30 of logic circuit 4*c*; with the output of the *fourth* bit position of register 1 on lead 1*d* in logic circuit 4*d* and so on until the output of the last (tenth) bit position of register 1 on lead 1*j* is compared with the outputs on leads 1*a* through 3*j* in weighting circuits 26–1 through 26–30 of logic circuit 4*j*.

Weighting circuits 17–1 through 17–30 (and the weighting circuits in the other logic circuits 4*b* through 4*j*) each include circuitry (to be later described) such that when a 1-bit is present in the first bit position of register 1 providing a 1-bit signal on lead 1*a*, each of the weighting circuits 17–1 through 17–30 will be set in a given condition if a 1-bit signal is also present on any of the leads 1*b* through 3*j* from the associated bit positions of the registers 1, 2, and 3. Likewise, for logic circuit 4*b*, when a 1-bit is present in the second bit position of register 1 and provides a 1-bit signal on lead 1*b*, those ones of weighting circuits 18–1 through 18–30 associated with leads 1*a* through 3*j* which also have 1-bit signals present thereon will be set in a given condition. Conversely, if the first bit position of register 1 contained a 0-bit, none of the weighting circuits 17–1 through 17–30 of logic circuit 4*a* could be set in the given condition and if the second bit position of register 1 contained a 0-bit, none of the weighting circuits 18–1 through 18–30 of logic circuit 4*b* could be set in the given condition.

It is seen therefore, that the possible 1-bit signals from the thirty bit positions of registers 1, 2, and 3 are associated with the possible 1-bit signals from the ten bit positions of register 1 by means of the weighting circuits in the ten logic circuits 4*a* through 4*j* respectively.

Referring to FIG. 3, an illustration of the elements included in each of the weighting circuits 17–1 through 17–30, 18–1 through 18–30, etc. are shown. The weighting circuit includes a first "AND" circuit 30, a latch circuit 31, and a second "AND" circuit 32. All the weighting circuits in the logic circuits 4*a* through 4*j* are identical to that shown in FIG. 3, but for purposes of explanation the circuit of FIG. 3 will represent weighting circuit 17–2 (of FIG. 2) so that the input leads may be designated 1*a* and 1*b*. Lead 1*a* is connected directly to "learning" "AND" circuit 30 and lead 1*b* is connected through ganged switch 33 to learning "AND" circuit 30 when contact 33*a* is closed and contact 33*b* is open and to "testing" "AND" circuit 32 when contact 33*a* is open and contact 33*b* is closed. When either contact 33*a* or 33*b* is open, the effect is as if a 0-bit signal is present at the input of "AND" circuit 30 or 32, respectively. The output of "AND" circuit 30 is connected to latch circuit 31 (e.g. flip-flop) and the output of latch circuit 31 is connected as the second input to "AND" circuit 32. The output of "AND" circuit 32 represents the output of the weighting circuit and is connected to a summing circuit along with the outputs of the other weighting circuits as shown in FIG. 2.

In the learning mode switch 33 is positioned such that contact 33*a* is closed (on all weighting circuits) and contact 33*b* is opened. The presence of a 1-bit on both input leads (1*a* and 1*b*) will gate "AND" circuit 30 and provide an output signal which triggers latch circuit 31 into a 1-bit output state. This is the "given condition" previously mentioned. A 0-bit on either input lead 1*a* or 1*b* will not gate "AND" circuit 30 and latch circuit 31 will remain in the 0-bit output state. The 1-bit output condition during the learning mode indicates that, at a given time, a 1-bit was present on lead 1*b* (and in the second bit position of register 1) when a 1-bit was present on lead 1*a* (and in the first bit position of register 1).

Referring again to FIG. 2, the condition of the latch circuit in each weighting circuit indicates whether a 1-bit was present in the associated bit position of the associated register at the same time as a 1-bit was present in a given one of the bit positions of register 1. For example, a 1-bit condition of the latch circuit in weighting circuit 17–1 indicates that a 1-bit was present in the first bit position of register 1. A 1-bit condition of the latch circuit in weighting circuit 17–2 indicates that a 1-bit was present in the second bit position of register 1 at the same time that a 1-bit was present in the second bit position of register 1. A 1-bit condition of the latch circuit in weighting circuit 17–20 indicates that a 1-bit was present in the last bit position of register 2 at the same time that a 1-bit was present in the first bit position of register 1. A 1-bit condition of the latch circuit in weighting circuit 18–4 indicates that a one bit was present in the fourth bit position of register 1 at the same time that a 1-bit was present in the second bit position of register 1.

In the present example there are ten logic circuits 4*a* through 4*j* (FIG. 1A) each containing thirty weighting circuits for a total of three hundred weighting circuits (and therefore three hundred latching circuits). The three hundred latching circuits indicate which of the thirty bit positions of the registers 1, 2, and 3 contain a 1-bit at the same time that any one of the ten bit positions of register 1 also contain 1-bits. More specifically, the thirty weighting circuits of logic circuit 4*a* indicate which of the thirty register bit positions contain a 1-bit when the first bit position of register 1 contains a 1-bit. The thirty weighting circuits of logic circuit 4*b* indicate which of the thirty register bit positions contain a 1-bit when the second bit position of register 1 contains a 1-bit. The thirty weighting circuits of logic circuit 4*c* indicate which of the thirty register bit positions contain a 1-bit when the third bit position of register 1 contains 1-bit, and so on to the thirty weighting circuits in logic circuit 4*j* which indicate which of the thirty register bit positions contain a 1-bit when the last bit position of register 1 contains a 1-bit.

Referring to FIG. 3, in the testing mode (to be later described) switch 33 of all the weighting circuits are positioned such that contact 33*a* is open and contact 33*b* is closed. In FIG. 3 presume latch circuit 31 has been set to the 1-bit output condition during the learning mode and is providing one of the gating signals to "testing" "AND" circuit 32. A 1-bit on lead 1*b* during the testing mode will gate "AND" circuit 32 and provide an output signal to the associated summing circuit (such as summing circuit 9*a*).

In operation, consider that the bit positions of each of the registers 1, 2, and 3 (FIG. 1A) are initially set to the 0-bit condition. For explanation, the sub-patterns set forth in Table I will be introduced into the system. The system is arranged for the learning mode, that is, the contacts 33*a* of switches 33 (FIG. 3) of each of the weighting circuits are closed (and contacts 33*b* are open) and the latch circuits 31 are in the 0-bit output state. The first sub-pattern "DAD" is entered (via gate 1*m*) in register 1 (FIG. 1A) at time $t_1$. Thus, the first and fourth bit positions of register 1 will be in the 1-bit state while the remaining bit positions of register 1 and all the bit positions of registers 2 and 3 will be in the 0-bit state. At time $t_2$ the 1-bit signals will be gated through leads 1*a* and 1*d* and applied to weighting circuits 17–1 and 17–4 of logic circuit 4*a* and to corresponding first and fourth weighting circuits in each of the other nine logic circuits 4*b* through 4*j*. In logic circuit 4*a* the latch circuit 31 in weighting circuit 17–1 will produce a 1-bit output signal since input lead 1*a* is "ANDed" with itself. The latch circuit in weighting circuit 17–4 will also be set to the 1-bit output state since the input lead 1*a* is "ANDed" with input lead 1*d*. In logic circuit 4*d* the latch circuits in the first and fourth weighting circuit 20–1 and 20–4 will produce 1-bit outputs since input lead 1*a* will be "ANDed" with input lead 1*d* at weighting circuit 20–1 and input lead 1*d* will be "ANDed" with itself at weighting circuit 20–4. The remaining two hundred and ninety-six latch circuits in each of the weighting circuits will continue to produce 0-bit output signals since in no other weighting circuits are the 1-bit leads 1*a* and 1*d* connected to a common "AND" gate.

The 1-bit output states of the latch circuits in weighting circuits 17–1, 17–4, 20–1, and 20–4 indicate that an A was present in register 1 at the same time that a D was present in register 1 and that no other letters were present in registers 1, 2, and 3.

At time $t_3$ the second sub-pattern "HAD" is entered into shift register 1 and the first sub-pattern "DAD" is entered into register 2 via gate 2*m*. With "DAD" in register 2 and "HAD" in shift register 1 there will be 1-bits in the first and fourth bit positions of register 2 and in the first, fourth, and eighth bit positions of register 1 (see Table I). Thus at time $t_4$ there will be 1-bit signals gated onto leads 1*a*, 1*d*, 1*h*, 2*a*, and 2*d*. The signal on lead 1*a* will be "ANDed" with the signals on leads 1*a*, 1*d*, 1*h*, 2*a*, and 2*d* at weighting circuits 17–1, 17–4, 17–8, 17–11, and 17–14 of logic circuit 4*a*. The latch circuits in weighting circuits 17–1 and 17–4 are already in the 1-bit output state and will remain so, and the latch circuits in weighting circuits 17–8, 17–11, and 17–14 will be switched to the 1-bit output state. Likewise, the signal on lead 1*d* will be "ANDed" with the signals on leads 1*a*, 1*d*, 1*h*, 2*a*, and 2*d* in logic circuit 4*d* resulting in 1-bit output states in the latch circuits of weighting circuits 20–1, 20–4, 20–8, 20–11, and 20–14. In logic circuit 4*h* the signal on lead 1*h* is "ANDed" with the signals on leads 1*a*, 1*d*, 1*h*, 2*a*, and 2*d* which sets the latch circuits in weighting circuits 24–1, 24–4, 24–8, 24–11, and 24–14. Thus there are now a total of fifteen latch circuits set to the 1-bit output state. The 1-bit output states of the fifteen latch circuits indicate that an A was present in register 1 at the same time that a D and H were present in register 1 with an A and D present in register 2; that a D was present in register 1 at the same time that an A and H were present in register 1 with an A and D present in register 2; and that an H was present in register 1 at the same time that an A and D were present in register 1 with an A and D present in register 2.

At time $t_5$ the third sub-pattern "CHAFE" is entered into register 1, the "HAD" sub-pattern is entered into register 2, and the "DAD" sub-pattern is entered into register 3. With registers 1, 2, and 3 thus arranged, at time $t_6$ there will be 1-bit signals gated onto leads 1*a*, 1*c*, 1*e*, 1*f*, 1*h*, 2*a*, 2*d*, 2*h*, 3*a*, and 3*d*. The signals on leads 1*a*, 1*c*, 1*e*, 1*f*, and 1*h* are each separately "ANDed" with the signals on all the leads 1*a*, 1*c*, 1*e*, 1*f*, 1*h*, 2*a*, 2*d*, 2*h*, 3*a*, and 3*d* in logic circuits 4*a*, 4*c*, 4*e* 4*f*, and 4*h* resulting in 1-bit output states in the latch circuits of the weighting circuits set forth as follows

*Table II*

| | Logic circuit 4*a* | Logic circuit 4*c* | Logic circuit 4*e* | Logic circuit 4*f* | Logic circuit 4*h* |
|---|---|---|---|---|---|
| Weighting circuit | 17–1 | 19–1 | 21–1 | 22–1 | 24–1 |
| | 17–3 | 19–3 | 21–3 | 22–3 | 24–3 |
| | 17–5 | 19–5 | 21–5 | 22–5 | 24–5 |
| | 17–6 | 19–6 | 21–6 | 22–6 | 24–6 |
| | 17–8 | 19–8 | 21–8 | 22–8 | 24–8 |
| | 17–11 | 19–11 | 21–11 | 22–11 | 24–11 |
| | 17–14 | 19–14 | 21–14 | 22–14 | 24–14 |
| | 17–18 | 19–18 | 21–18 | 22–18 | 24–18 |
| | 17–21 | 19–21 | 21–21 | 22–21 | 24–21 |
| | 17–24 | 19–24 | 21–24 | 22–24 | 24–24 |

Certain ones of the latch circuits in the weighting circuits set forth in Table II had been previously set to the 1-bit output state at time $t_2$ and $t_4$ and the "ANDing" at such circuits at time $t_6$ has no effect and they remain in the 1-bit output condition. In addition, the latch circuits in weighting circuits 17–4, 20–1, 20–4, 20–8, 20–11, 20–14, and 24–4 had been set in the 1-bit output state at times $t_2$ and $t_4$ so that the total number of fifty-six latch circuits have been set to the 1-bit output state as set forth in Table III.

*Table III*

| | Logic circuit 4*a* | Logic circuit 4*c* | Logic circuit 4*d* | Logic circuit 4*e* | Logic circuit 4*f* | Logic circuit 4*h* |
|---|---|---|---|---|---|---|
| Weighting circuit | 17–1 | 19–1 | 20–1 | 21–1 | 22–1 | 24–1 |
| | 17–3 | 19–3 | -------- | 21–3 | 22–3 | 24–3 |
| | 17–4 | -------- | 20–4 | -------- | -------- | 24–4 |
| | 17–5 | 19–5 | -------- | 21–5 | 22–5 | 24–5 |
| | 17–6 | 19–6 | -------- | 21–6 | 22–6 | 24–6 |
| | 17–8 | 19–8 | 20–8 | 21–8 | 22–8 | 24–8 |
| | 17–11 | 19–11 | 20–11 | 21–11 | 22–11 | 24–11 |
| | 17–14 | 19–14 | 20–14 | 21–14 | 22–14 | 24–14 |
| | 17–18 | 19–18 | -------- | 21–18 | 22–18 | 24–18 |
| | 17–21 | 19–21 | -------- | 21–21 | 22–21 | 24–21 |
| | 17–24 | 19–24 | -------- | 21–24 | 22–24 | 24–24 |

The fifty-six latch circuits set to their 1-bit output states provide a total accumulated indication relating to which of the thirty bit positions of storage registers 1, 2, and 3 contained 1-bits concurrently with 1-bits stored in any of the ten bit positions of register 1 at three points in time. First, when the first sub-pattern was entered in register 1; second, when the first sub-pattern was entered in register 2 and the second sub-pattern was entered in register 1; and third, when the first, second, and third sub-patterns were entered in registers 3, 2, and 1 respectively.

In effect, the system, by means of the latch circuits set to the 1-bit state, has stored the input pattern and more particularly, has provided a single pattern of latch circuits which stored the three sub-patterns which were sequential in time. The system is now conditioned to recognize the sequential sub-patterns set forth in Table I within limits established by the threshold circuits as will be later described. The system now has the capability to reject input patterns other than sub-patterns "similar" to the sub-patterns entered during the learning mode.

In the "testing" mode the bit positions of storage registers 1, 2 and 3 are switched to the 0-bit state by a pulse on the designated reset leads (FIG. 1A) and the switches 33 (FIG. 3) in all the weighting circuits 17–1 through 26–30 are positioned such that contact 33*a* is open and contact 33*b* is closed, thus connecting leads 1*a* through 3*j* to the associated ones of "AND" circuits 32 in the weighting circuits in each of the logic circuits 4*a* through 4*j*.

Presume that for the testing mode the input pattern is identical to that employed in the learning mode, that is, the three sequential sub-patterns set forth in Table I. At time $t_1$ the first sub-pattern "DAD" is entered into storage register 1 and at time $t_2$ it is gated onto leads 1*a* through 1*j* along with the 0-bit signals from registers 2 and 3 on leads 2*a* through 3*j*. Leads 1*a* through 3*j* are connected to the weighting circuits in each of the logic circuits 4*a* through 4*j*. Referring to FIG. 3, it is seen that the lead 1*b* is connected directly to testing "AND" circuit 32 and is decoupled from "AND" circuit 30 effectively establishing a 0-bit condition at the input of "AND" circuit 30. Therefore, presence of a 1-bit or a 0-bit on lead 1*a* will be immaterial since "AND" circuit 30 cannot be gated. If the latch circuit 31 in a particular weighting circuit was not set to the 1-bit output state during the learning mode, the presence of a 1-bit on the associated input lead to the "AND" circuit 32 will also be immaterial since the signal to "AND" circuit 32 from such latch circuit 31 will be a 0-bit. For example, after the three sub-patterns had been entered in the system during the learning mode, latch circuit 31 of the particular weighting circuit 17–2 (FIG. 3) remained in the 0-bit state. Thus a 1-bit on lead 1*b* during the testing mode would not gate "AND" circuit 32.

Referring to the present testing mode example, the first sub-pattern "DAD" in register 1 is transmitted to the weighting circuits on leads 1*a* through 1*j* with the 0-bits from registers 2 and 3 on lead 2*a* through 3*j*. Thus, there will be 1-bits on leads 1*a* and 1*d*. The 1-bits on leads 1*a* and 1*d* are applied to the first and fourth weighting circuits in each of the logic circuits 4*a* through 4*j*. It was explained that the latch circuits in the weighting circuits set forth in Table III have been set to the 1-bit output state. Therefore, the 1-bit signals on leads 1*a* and 1*d* will produce an output signal from "AND" circuits 32 in weighting circuits 17–1, 17–4, 19–1, 20–1, 20–4, 21–1, 22–1, 24–1 and 24–4. In FIG. 1 the outputs from "AND" circuits 32 in weighting circuits 17–1 and 17–4 are added in summing circuit 9*a*, the outputs from "AND" circuit 19–1 is applied to summing circuit 9*c*, the outputs from weighting circuits 20–1 and 20–4 are added in summing circuit 9*d*, the output of weighting circuits 21–1 and 22–1 are applied to summing circuits 9*e* and 9*f* respectively, and the outputs of weighting circuits 24–1 and 24–4 are added at summing circuit 9*h*.

The signals on leads 1*a* through 3*j* from registers 1, 2, and 3 are connected via cables 5, 6, and 7 to summing circuit 9*k*. Since only leads 1*a* and 1*d* contain 1-bit signals, the output signal from summing circuit 9*k* will represent a sum of two. The output signal from summing circuit 9*k* is applied to each of the threshold circuits 10*a* through 10*j* and sets the threshold levels thereof equal to the two bit level. The output signals from summing circuits 9*a* through 9*j* are also applied to threshold circuits 10*a* through 10*j*. Since only summing circuits 9*a*, 9*d*, and 9*h* of the summing circuits 9*a* through 9*j* have levels of two bits, there will be output signals only from threshold circuits 10*a*, 10*d*, and 10*h* which are applied to "AND" circuits 11*a*, 11*d*, and 11*h*. Note, the threshold circuits 10*a* through 10*j* each produce a 1-bit output signal for input signals equal to or above the threshold level and 0-bit output signals for input signals below the threshold level.

The ten outputs leads 1*a* through 1*j* associated with the ten bit positions of register 1 are also connected, via cable 5, to "AND" circuits 11*a* through 11*j* with lead 1*a* being connected to "AND" circuit 11*a*, lead 1*b* being connected to "AND" circuit 11*b*, and so on. The "ANDing" of the outputs of threshold circuits 10*a* through 10*j* with the signals on leads 1*a* through 1*j* insures that a 1-bit is present in register 1 when a recognition is indicated. Thus, although there are output signals from threshold circuits 10*a*, 10*d*, and 10*h*, only leads 1*a* and 1*d* have 1-bit signals thereon and "AND" circuit 11*h* will not be gated.

The outputs from threshold circuits 10*a* and 10*d* are "ANDed" with the 1-bits on leads 1*a* and 1*d* at "AND" circuits 11*a* and 11*d*. It is significant to note that the outputs of "AND" circuits 11*a* and 11*d* are indicative that an "A" was present with a "D" in the first sub-pattern of both the learning input pattern and the testing input pattern. The 1-bit output signal of circuits 11*a* and 11*d* are added at summing circuit 12 via cable 13. The amplitude of the output signal from summing circuit 12 is therefore at a two bit level. The signals on leads 1*a* through 1*j* are also added at summing circuit 14. In the present instance there will be 1-bit signals on leads 1*a* and 1*d* producing a two bit level output signal from summing circuit 14. The output signal from summing circuit 12 is applied to dividing circuit 15 where it is divided by the output signal from summing circuit 14. The value of the output signal from dividing circuit 15 on lead 16 is termed the "match" number. In the present instance the output signal from dividing circuit 15 is the ratio of the two bit level signal from summing circuit 12 and the two bit level signal from summing circuit 14, which results in a ratio of "one." The amplitude of the output signal on lead 16 would therefore represent a ratio of "one," which is the maximum value of the match number. This was to be expected since the first sub-pattern "DAD" of the input testing pattern was identical to the first sub-pattern employed to condition the system during the learning mode.

If a second sub-pattern "HAD" is entered into register 1 and the first sub-pattern "DAD" is shifted to register 2, the operation of the system of FIG. 1 would be similar to the preceding description. There would be 1-bit signals on leads 1*a*, 1*d*, 1*h*, 2*a*, and 2*d*. The 1-bit signal on lead 1*a* would be gated by the 1-bit signal from "AND" circuits 32 of weighting circuits 17–1, 19–1, 20–1, 21–1, 22–1, and 24–1. The signal on lead 1*d* would be gated in weighting circuits 17–4, 20–4, and 24–4. The signal on lead 1*h* would be gated by weighting circuits 17–8, 19–8, 20–8, 21–8, 22–8, and 24–8. The signal on lead 2*a* would be gated by weighting circuits 17–11, 19–11, 20–11, 21–11, 22–11, and 24–11, and the signal on lead 2*d* would be gated by weighting circuits 17–14, 19–14, 20–14, 21–14, 22–14, and 24–14 (in accordance with Table III). This results in a five bit level output signal from summing circuits 9*a*, 9*d*, and 9*h*, and a four bit level output signal from summing circuits 9*c*, 9*e*, and 9*f*. The 1-bit signals on leads 1*a*, 1*d*, 1*h*, 2*a*, and 2*d* are added at summing circuit 9*k* to produce a five bit level output signal which is employed to set the threshold level of threshold circuits 10*a* through 10*j* at a five bit level. Thus, only the five bit level output signals from summing circuits 9*a*, 9*d*, and 9*h* will cause a 1-bit signal from threshold circuits 10*a* and 10*d* be applied to the "AND" circuits 11*a*, 11*d*, and 11*h*. The 1-bit signals from threshold circuits 10*a*, 10*d*, and 10*h* are gated through "AND" circuits 11*a*, 11*d*, and 11*h* by the 1-bit signals on leads 1*a*, 1*d*, and 1*h*, and are added at summing circuit 12 to provide a three bit level signal to dividing circuit 15. The signals on leads 1*a* through 1*j* are added by summing circuit 14 to provide a three bit level (due to leads 1*a*, 1*d*, and 1*h*) to dividing circuit 15. The ratio of the two input signals to dividing circuit 15 is unity, and the output signal on lead 16 would represent a "one" match number. This indicates that the second sub-pattern entered in register 1 during the testing mode is similar with the second sub-pattern employed in the learning mode.

Presume also that a third sub-pattern "CHAFE" is entered into register 1 with "HAD" in register 2 and "DAD" in register 3. The total testing pattern is now identical with the total learning pattern. When the contents of the registers 1, 2, and 3 are gated to logic circuits 4*a* through 4*j*, there will be 1-bit signals present on leads 1*a*, 1*c*, 1*e*, 1*f*, 1*h*, 2*a*, 2*d*, 2*h*, 3*a*, and 3*d*. These leads are connected to the "AND" circuits 32 in associated weighting circuits in each of the logic circuits 4*a* through 4*j*. Also the latch circuits in the weighting circuits set forth in Table III are in the 1-bit output state and are conditioning their associated "AND" circuits 32. The 1-bit signals on leads 1*a*, 1*c*, 1*e*, 1*f*, 1*h*, 2*a*, 2*d*, 2*h*, 3*a*, and 3*d* will produce 1-bit output signals from each of the weighting circuits set forth in Table III with the exception of weighting circuits 17–4, 20–4, and 24–4 (there being no 1-bit signal on lead 1*d*). Thus summing circuits 9*a*, 9*c*, 9*e*, 9*f*, and 9*h* will each produce a ten bit level output signal, and summing circuit 9*d* will produce a four bit level output signal. There are a total of ten 1-bit signals on the thirty leads 1*a* through 1*j*, and summing circuit 9*k* will produce of ten bit level output signal which is employed to set the threshold level of threshold circuits 10*a* through 10*j* at a ten bit level. Thus, there will be a 1-bit signal produced at the output of threshold circuits 10*a*, 10*c*, 10*e*, 10*f*, and 10*h*. The output signal from threshold circuit 10*d* will remain in the 0-bit state since the four bit level signal from summing circuit 9*d* was below the threshold level.

The 1-bit output signals from threshold circuits 10*a*, 10*c*, 10*e*, 10*f*, and 10*h* are gated with the 1-bit signals on leads 1*a*, 1*c*, 1*e*, 1*f*, and 1*h* at "AND" circuits 11*a*, 11*c*, 11*e*, 11*f*, and 11*h* respectively. The output signals from the five "AND" circuits 11*a*, 11*c*, 11*e*, 11*f*, and 11*h* are added at summing circuit 12, resulting in a five bit level output signal being applied to dividing circuit 15.

The 1-bit signals on leads 1*a*, 1*c*, 1*e*, 1*f*, and 1*h* are added at summing circuit 14 to also produce a five bit level output signal which is applied to dividing circuit 15. The output signal from dividing circuit 15 is thus representative of a unity ratio or a "one" match nnmber. This indicates that the third sub-pattern entered into register 1 during the testing mode is similar to the third sub-pattern employed in the learning mode. The average match number for the three sub-patterns employed in the testing mode is therefore "one."

If the input pattern entered in the testing mode is not similar to the pattern employed in the learning mode, the output signal on lead 16 will represent a match number well below the maximum of one. Consider that the pattern set forth in Table I was entered during the learning mode with the result that the latch circuits of the weighting circuits set forth in Table III are in their 1-bit output state and that registers 1, 2, and 3 have been reset to their 0-bit state. Consider also that a different pattern, for example, HIDE, EACH, FIG, is entered into the system in the testing mode. The binary equivalent for such pattern is set forth as follows.

*Table IV*

| | A | B | C | D | E | F | G | H | I | J |
|---|---|---|---|---|---|---|---|---|---|---|
| Sub-pattern No. 1 | 0 | 0 | 0 | 1 | 1 | 0 | 0 | 1 | 1 | 0 |
| Sub-pattern No. 2 | 1 | 0 | 1 | 0 | 1 | 0 | 0 | 1 | 0 | 0 |
| Sub-pattern No. 3 | 0 | 0 | 0 | 0 | 0 | 1 | 1 | 0 | 1 | 0 |

The first sub-pattern "HIDE" of Table IV is gated into storage register 1 at time $t_1$ and then gated to logic circuits 4*a* through 4*j* (along with the 0-bit contents of registers 2 and 3 at time $t_2$. Leads 1*d*, 1*e*, 1*h*, and 1*i* will contain 1-bit signals. In accordance with Table III, the 1-bit signals on leads 1*d*, 1*e*, 1*h* and 1*i* will produce output signals from weighting circuits 17–4, 17–5, 17–8, 19–5, 19–8, 20–4, 20–8, 21–5, 21–8, 22–5, 22–8, 24–4, 24–5, and 24–8. Thus, there will be a three bit level output signal from summing circuits 9*a* and 9*h* and two bit level output signals from summing circuits 9*c*, 9*d*, 9*e*, and 9*f*. The 1-bit signals on leads 1*d*, 1*e*, 1*h*, and 1*i* are added and produce a four bit level output signal at summing circuit 9*k* which is employed to set the threshold level of threshold circuits 10*a* through 10*j* to a four bit level. None of the output signals from summing circuits 9*a*, 9*c*, 9*d*, 9*e*, 9*f*, or 9*h* will pass the threshold circuits, and the result will be a zero level output signal from summing circuit 12. When the zero level signal from summing circuit 12 is divided by the four bit level signal from summing circuit 14, the result is a zero match output signal on lead 16. The zero match indication is due in part to the fact that the letter "I" was never present in register 1 during the learning mode.

The second sub-pattern "EACH" is entered into register 1 and the first sub-pattern "HIDE" is shifted into register 2 at time $t_3$. At time $t_4$ the register contents are gated to logic circuits 4*a* through 4*j* and there are 1-bit signals on leads 1*a*, 1*c*, 1*e*, 1*h*, 2*d*, 2*e*, 2*h*, and 2*i* which produce output signals from weighting circuits 17–1, 17–3, 17–5, 17–8, 17–14, 17–18, 19–1, 19–3, 19–5, 19–8, 19–14, 19–18, 20–1, 20–8, 20–14, 21–1, 21–3, 21–5, 21–8, 21–14, 21–18, 22–1, 22–3, 22–5, 22–8, 22–14, 22–18, 24–1, 24–3, 24–5, 24–8, 24–14, and 24–18. Thus there will be six bit level output signals from summing circuits 9*a*, 9*c*, 9*e*, 9*f*, and 9*h* and a three bit level signal from summing circuit 9*d*.

The 1-bits on leads 1*a*, 1*c*, 1*e*, 1*h*, 2*d*, 2*e*, 2*h*, and 2*i* are added and applied as an eight bit level threshold signal to threshold circuits 10*a* through 10*j* via summing circuit 9*k* with the result that none of the signals from the preceding summing circuits will be transmitted to "AND" circuits 11*a* through 11*j*. Thus there are no input signals to summing circuit 12 and the output signal from summing circuit 12 to dividing circuit 15 is zero. When the zero level input to dividing circuit 15 is divided by the four bit level signal from summing circuit 14, the result is a zero level output signal on lead 16 indicating a zero match ratio. The zero match is due in part to the fact that the letters "I" and "E" never were present in register 2 during the learning mode.

If the third sub-pattern "FIG" is entered into register 1 and the above-described routine is repeated, it will be seen that a zero match will again be indicated output lead 16 for a total average match of zero for the entire pattern.

It is possible that match indications greater than zero but less than unity will be produced. This occurs when the initial sub-patterns of the testing input pattern exclusively contain the same letters as had been present in the registers during the learning mode. For example, if the testing pattern had been EACH, HIDE, FIG, then when the first sub-pattern EACH was entered in register 1 and tested, a match indication of one would be produced because register 1 contained the letters A C E H during the learning mode (when CHAFE was entered). However, when the second and third sub-patterns are tested, they would produce zero match indications for a total average match of 0.34 for the entire pattern.

In actual practice, it would be quite remote that a single sub-pattern would produce a "one" match number were it not to include the same letters as a sub-pattern employed during the learning mode, and if such instance occurred, the average match number for the entire pattern would indicate whether the tested pattern was identical to the learned pattern. It would not be likely that an entire pattern would include sub-patterns having the same letters as the learning pattern were it not identical thereto. This is particularly true if the sub-patterns are not restricted to a class of ten bits or elements as in the present example, and if patterns having greater than three sub-patterns are employed.

For this reason the requirements of the system may be relaxed in given instances. For example, it may be determined that the threshold levels of threshold circuits 10*a* through 10*j* need not be set at a value equal to the sum of the 1-bits on leads 1*a* through 3*j* in a given instance, and instead summing circuit 9*k* may be adjusted to provide an output threshold setting signal which is, for example, 0.75 percent of the sum. This may provide an output from the threshold circuits even in the event of an error in a binary digit. Also, the output match number may not be required to be unity for a recognition, but lesser valued match numbers may be accepted to also overcome single errors in given sub-patterns which do not effect the overall correctness of the input testing pattern.

What has been described is an adaptive recognition system which reconstructs, in terms of settings of latching circuits, a group of sequential sub-patterns originally entered as input signals. The reconstruction of the sub-patterns by the system then functions as a filter with respect to other input sub-patterns. That is, the input sub-patterns will be permitted to pass to the output of the circuit only to the extent that they resemble the original sub-pattern. An average match number is obtained at the system output which indicates the degree to which the total input pattern resembles the original pattern. If an average match number above a selected level is not produced, it is known that the input pattern is not the same or similar to the original pattern.

Thus, the invention may be referred to as a "positive" recognition system wherein the pattern to be recognized is first employed to condition the recognition circuits. A system of this type is useful when the input sub-patterns are related to a large class of variables. For example, in the previously mentioned instance where the sub-patterns may be related to physical measurements made at various points on the human body during each heartbeat, the recognition criteria may be to distinguish between normal and abnormal patients. Since the number of possible physical abnormalities are great, it would not be practical to provide a recognition system having stored indications of all such abnormalities. The system of the present invention may be used, however, since all that need be required is that the system be conditioned to provide a "positive" analog of a normal patient, and all rejected inputs would then be known to be abnormal.

The embodiment described related to ten-bit sub-patterns. It would be possible to employ sub-patterns of greater bit length (i.e., $n$ bits) by using registers with $n$ storage positions. There would also be $n$ logic circuits and associated summing circuits, threshold circuits, etc.) required, and the number of weighting circuits in each logic circuit would be $n$ times the number of registers.

Also, in the foregoing discussion, three storage registers were shown and input patterns having three sub-patterns were described. If sequences of greater than three sub-patterns are desired, two approaches are possible. A storage register may be provided for each sub-pattern in the input pattern. This approach, however, would require extensive structure, for example an input having ten sub-patterns with ten bit positions each would require ten storage registers and one thousand weighting circuits. A more practical approach is to provide an adequate number of storage registers, for example, three, and to shift the input sub-patterns sequentially therethrough. If ten sub-patterns are included in the input pattern, the first three sub-patterns would be compared to each other as described hereinabove. When the fourth sub-pattern is entered into the first storage register, the first sub-pattern is shifted out of the third storage register. Thus, the fourth sub-pattern is compared to the second and third sub-patterns, but not to the first sub-pattern. Likewise, the fifth sub-pattern is compared to the third and fourth sub-patterns, but not to the first and second sub-patterns. Such operation is not as complete as comparing each of the sub-patterns with all the others, but the system will nevertheless function with a high degree of reliability and the more complex system is not required.

While the invention has been particularly shown and described with reference to a preferred embodiment thereof, it will be understood by those skilled in the art that various changes in form and details may be made therein without departing from the spirit and scope of the invention.

What is claimed is:

1. An adaptive recognition system comprising adaptive means responsive to at least one coded signal of the type composed of $n$ code bits being in either a first or second binary state for providing an analog representation of the relationship of each of the $n$ code bits in said first binary state in combination with the other of the $n$ code bits in said first binary state, means for introducing at least one further coded signal of the type composed of $n$ code bits being in either a first or second binary state to said adaptive means for producing output signals from said adaptive means representative of the relationship between the $n$ code bits of said one further coded signal and said analog representation, means for summing said output signals from said adaptive means into a plurality of sub-groups and for producing output signals representative of selected ones of said sub-groups, and means for comparing the code bits of said one further coded signal in said first binary state with the output signals from said summing means for producing an output signal representative of the similarity between said at least one coded signal and said at least one further coded signal.

2. An adaptive recognition system comprising adaptive means responsive to a first plurality of sequential coded signals of the type composed of $n$ code bits being in either a first or second binary state for providing an analog representation of the relationship of each of the $n$ code bits in said first binary state in each coded signal in combination with all the code bits in said first binary state of all the coded signals of said first plurality, means for introducing a second plurality of sequential coded signals of the type composed of $n$ code bits being in either a first or second binary state to said adaptive means for producing output signals from said adaptive means representative of the relationship between the code bits of said second sequential coded signals and said analog representation, means for summing said output signals from said adaptive means into a plurality of sub-groups and for producing output signals representative of selected ones of said sub-groups, and means for comparing the output signals from said summing means with the code bits in said first binary state of a separate given one of said second sequential coded signals for producing output signals representative of the similarity between said first sequential code signals and said second sequential coded signals.

3. An adaptive recognition system comprising adaptive means responsive to a first plurality of sequential coded signals of the type composed of $n$ code bits being in either a first or second binary state for providing an analog representation of the relationship of each of the $n$ code bits in said first binary state in each coded signal in combination with all the code bits in said first binary state of all the coded signals of said first plurality, means for introducing a second plurality of sequential coded signals of the type composed of $n$ code bits being in either a first or second binary state to said adaptive means for periodically producing output signals from said adaptive means representative of the relationship between the code bits of said second sequential coded signals and said analog representation, means for summing said periodically occurring output signals from said adaptive means into a plurality of sub-groups and for producing periodically occurring output signals representative of selected ones of said sub-groups, and means for periodically comparing the periodically occurring output signals from said summing means with the code bits in said first binary state of separate given ones of said second sequential coded signals for producing output signals representative of the similarity between said first sequential code signals and said second sequential coded signals.

4. An adaptive recognition system comprising adaptive means, including a plurality of bi-stable elements, responsive to at least one coded signal of the type composed of $n$ code bits being in either a first or second binary state, said means individually comparing each bit of said coded signal with itself and the other of the $n$ bits of said at least one coded signal and establishing a first stable state in a separate one of said bi-stable elements for each comparison of each of said code bits in said first binary state in combination with itself and the other ones of the $n$ bits also in said first binary state, means for introducing at least one further coded signal of the type composed of $n$ code bits being in either a first or second binary state to said bi-stable elements, said ones of said bi-stable elements in said first stable state producing an output signal in response to said bits of said further coded signal in said first binary state, first summing means for summing said output signals produced by said bi-stable elements into a plurality of sub-groups and producing output signals representative of selected ones of said sub-groups, second summing means for summing said output signals from said selected ones of said sub-groups, third summing means for summing said code bits in said first binary state of said at least one further coded signal, and means for comparing the outputs of said second and third summing means for producing an output signal representative of the similarity between said at least one coded signal and said at least one further coded signal.

5. An adaptive recognition system comprising an input means, an adaptive means coupled to said input means, a summing means coupled to said adaptive means and said input means, and a comparison means coupled to said summing means and said input means, said input means being responsive to a first plurality of sequential coded signals of the type composed of *n* code bits being in either a first or second binary state, said adaptive means being responsive to said first plurality of sequential coded signals from said input means for producing an analog representation of the relationship of each of the *n* code bits in said first binary state in each coded signal in combination with all the code bits in said first binary state of all the coded signals of said first plurality, said input means being further responsive to a second plurality of sequential coded signals of the type composed of *n* code bits being in either of first or second binary state, said adaptive means being further responsive to said second plurality of sequential coded signals from said input means for producing output signals representative of the relationship between the code bits of said second plurality of coded signals and said analog representation, said summing means being responsive to said signals from said adaptive means representative of the relationship between the code bits of said second plurality of coded signals and said analog representation and to said second plurality of sequential coded signals from said input means for summing said signals into a plurality of sub-groups and for producing output signals for selected ones of said sub-groups, and said comparison means being responsive to said output signals from said summing means and *n* code bits from a selected one of said plurality of sequential coded signals for providing an output signal representative of the similarity between said first plurality of coded signals and said second plurality of coded signals.

6. An adaptive recognition system according to claim 5 wherein said input means includes a plurality of signal storage devices each having *n* bit storage positions such that incoming sequential code signals are stored in a first one of said plurality of storage devices and are sequentially transferred to subsequent ones of said plurality of storage devices upon the reception of subsequent ones of said sequential code signals.

7. An adaptive recognition system according to claim 6 wherein said adaptive means includes a plurality of logic circuits, each logic circuit coupled to all the *n* bit positions of each one of said plurality of storage devices, and each logic circuit also coupled to a separate one of the *n* bit positions in said first one of said storage devices, each logic circuit providing analog representations of the presence of each of the *n* code bits in said first binary state of said first plurality of coded signals present in combination with the associated separate code bit in the first binary state of said code signal in said first one of said storage devices, and wherein each logic circuit is responsive to said second plurality of signals for producing output signals representative of the relationship between the code bits of said second plurality of coded signals in said first binary state and said analog representations.

8. An adaptive recognition system according to claim 7 wherein each logic circuit includes a plurality of latch circuits, a first one of said latch circuits having first and second input leads coupled to a single one of said bit positions of said first one of said storage devices and the others of said plurality of latch circuits having a first input lead coupled to the same said single one of said bit positions as said first latch circuit and a second input lead coupled to another one of said bit positions of said plurality of storage registers, each of said latch circuits changing state to provide an analog representation when the signals from said storage registers on said first and second input leads are in said first binary state when said input means is responsive to said first plurality of sequential coded signals.

9. An adaptive recognition system according to claim 8 wherein said summing means includes a first plurality of summing circuits, each one of which is coupled to a separate one of said logic circuits, a first individual summing circuit coupled to each bit position of said plurality of storage devices, and a plurality of threshold circuits, each one of which is coupled to the output of a separate one of said first plurality of summing circuits and to the output of said first individual summing circuit for producing output signals when the magnitude of the output signal from each one of said first plurality of summing circuits is at least the magnitude of the output signal from said first individual summing circuit.

10. An adaptive recognition system according to claim 9 wherein said comparison means includes a plurality of "AND" circuits, each one of which being coupled to the output of a separate one of said threshold circuits and to a separate one of the bit positions of said first one of said storage devices for producing an output signal when a signal is present from the output of said separate threshold circuit and a code bit in the first binary state is present in the said separate bit position, a second individual summing circuit coupled to the outputs of each of said plurality of "AND" gates for producing an output signal representative of the sum of the output signals therefrom, a third individual summing circuit coupled to the bit positions of said first one of said storage devices for producing a signal representative of the sum of the code bits in said bit positions in said first binary state, and a ratio circuit coupled to the outputs of said second and third individual summing circuits for providing an output signal proportional to the ratio of the output signals therefrom representative of the similarity between said first plurality of coded signals and said second plurality of coded signals.

11. An adaptive recognition system comprising:

a source of sequential code signals each having *n* binary code bits, said sequential code signals being arranged in a first plurality group and a second plurality group, a plurality of storage registers coupled in sequence, each having *n* storage elements for storing *n* binary code bits, a first one of said plurality of storage registers being coupled to said source of sequential code signals for storing in sequence each one of said code signals of said first plurality group and said second plurality group, a control means coupled to said plurality of storage registers for sequentially shifting said code signals from said first one of said storage registers to each successive ones of said storage registers, an adaptive means coupled to said storage registers and responsive to said first plurality group of stored code signals therefrom for producing an analog representation of the relationship of each of the binary code bits in a first binary state of each coded signal with all the code bits in said first binary state of all the coded signals of said first plurality group, said adaptive means being further responsive to said second plurality group of stored code signals from said storage registers for producing output signals representative of the relationship between the binary bits of the code signals of said second plurality group and said analog representation, a first summing means coupled to said adaptive means for summing said output signals therefrom into a plurality of sub-group signals, threshold means coupled to said summing means and said plurality of shift registers for summing the binary code bits in said first binary state of said code signals of said second plurality group and for providing output signals for ones of said plurality of sub-group signals having magnitudes greater than said sum of the binary code bits in said first binary state of said code signals of said second plurality group, means coupled to said threshold means and said first one of said storage registers for selectively gating the output signals from said threshold means with the binary bits of the code signal in said first storage register in said first binary state, a second summing means coupled to said first storage register for summing the binary bits of the code signal of said first storage register in said first binary state, and comparison means coupled to said second summing means and said gating means for providing an output signal of the ratio between the output signal from said gating means and the output signal from said second summing means representative of the similarity between the code signals of said second plurality group and said first plurality group.

References Cited by the Examiner

UNITED STATES PATENTS

| | | | |
|---|---|---|---|
| 2,905,520 | 9/59 | Anderson | 340—172.5 |
| 2,951,235 | 8/60 | Welsh | 340—172.5 |
| 2,972,128 | 2/61 | Eckert et al. | 340—172.5 |
| 3,103,648 | 9/63 | Hartmanis | 340—172.5 |
| 3,106,698 | 10/63 | Under | 340—172.5 |
| 3,106,699 | 10/63 | Kamentsky | 340—172.5 |
| 3,114,884 | 12/63 | Jakowatz | 328—121 |
| 3,119,935 | 1/64 | Samusenko | 340—172.5 |

MALCOLM A. MORRISON, *Primary Examiner.*